United States Patent [19]
Horsley

[11] 3,763,023
[45] Oct. 2, 1973

[54] PURIFICATION OF CHLOROACETYL CHLORIDE BY AZEOTROPIC DISTILLATION

[75] Inventor: Lee H. Horsley, Midland, Mich.

[73] Assignee: The Dow-Chemical Company, Midland, Mich.

[22] Filed: May 30, 1972

[21] Appl. No.: 257,833

[52] U.S. Cl................. 203/63, 203/67, 203/68, 203/69, 203/70, 260/544 Y
[51] Int. Cl.................. C07c 53/20, B01d 3/36
[58] Field of Search............... 260/544 Y; 203/63, 203/67, 68, 69, 70

[56] References Cited
UNITED STATES PATENTS
2,862,964  2/1958  Lacey .................. 260/544 Y
2,889,365  6/1959  Prill ..................... 260/544 Y
3,576,860  4/1971  Zazaris ................ 260/544 Y
3,686,302  8/1972  Opitz .................. 260/544 Y Primary Examiner—Wilbur L. Bascomb, Jr.
Attorney—William M. Yates et al.

[57] ABSTRACT

Monochloroaceyl chloride can be separated efficiently from dichloroacetyl chloride by adding an azeotrope-forming agent to the mixture and distilling off the monochloro acid chloride azeotrope. Azeotrope formers have a boiling point of about 90°–130°C. and are hydrocarbons, halogenated hydrocarbons and aliphatic ethers.

5 Claims, No Drawings

PURIFICATION OF CHLOROACETYL CHLORIDE BY AZEOTROPIC DISTILLATION

BACKGROUND OF THE INVENTION

This invention relates to a new chemical process and it concerns particularly a process for separating chloroacetyl chloride from its mixture with dichloroacetyl chloride by azeotropic distillation.

Chloroacetyl chloride is normally made by chlorinating acetic acid with a sulfur or phosphorus chloride which yields as the crude product, the desired chloroacetyl chloride mixed with small but appreciable quantities of under-chlorinated material and more or less of the dichlorinated acid chloride, depending upon the degree of chlorination. The under-chlorinated products are easily separable by distillation, but since the two chlorinated acid chlorides have very close boiling points, separation of these compounds by simple distillation is impractical. Substantial under chlorination essentially eliminates the dichloroacetyl chloride, but this procedure involves the distillation and recycle of an uneconomically impractical amount of unreacted acetic acid and acetyl chloride.

Chloroacetyl chloride forms lower boiling azeotropes with a number of dissimilar compounds such as hydrocarbons, halogenated hydrocarbons and ethers and dichloroacetyl chloride also forms lower boiling azeotropes with these same compounds. However, in both cases, the corresponding azeotropes have boiling points about as close as do the acid chlorides themselves. Therefore, azeotropic distillation appears to offer no better chance for effective separation of these acid chlorides than distillation of the mixed chlorides alone.

SUMMARY OF THE INVENTION

It has now been found quite unexpectedly that chloroacetyl chloride can be separated efficiently from dichloroacetyl chloride by adding to the mixture an azeotrope-forming compound and distilling off its azetrope with the monochloro acid chloride. Operable azeotrope-forming compounds have a boiling point at atmospheric pressure of about 90°–130°C., preferably about 95°–120°C., and are hydrocarbons, halogenated hydrocarbons and aliphatic ethers. A mixture of related compounds such as a saturated aliphatic hydrocarbon fraction having a boiling range within the defined limits can also be used.

DETAILED DESCRIPTION

The quantity of azeotrope-forming compound added to the chlorinated acid chloride mixture is not a critical factor, for any significant amount will distill from the mixture as its azeotrope with chloroacetyl chloride and so effect a separation to the extent that it is present. Preferably, enough azeotrope-former is used to separate essentially all of the chloroacetyl chloride. A smaller amount will result in incomplete recovery of chloroacetyl chloride while an excess requires unnecessary distillation to remove it.

The distillation pressure is also not a critical condition. Preferably, the distillation is run at a pressure between about 10 mm. Hg and atmospheric pressure for reasons of distillate condensation efficiency at lower pressures and increasing corrosion of equipment and thermal decomposition of products at higher pressures.

The classes of azeotrope-forming compounds suitable for use in this process can be divided into a number of groups and subgroups. Thus, aliphatic, cycloaliphatic and aromatic hydrocarbons having normal boiling points within the defined range are operable. The aliphatic hydrocarbons can be defined further as saturated, olefinic and acetylenic aliphatic hydrocarbons. These can be branched or straight chain compounds. Examples of these various groups are n-heptane, 2,4,4-trimethyl-1-pentene, 1-heptyne, 2-methylhexane, n-octane, 2,4-dimethylhexane, methylcyclohexane, methylcyclohexene and toluene. For obvious reasons, hydrocarbons containing no aliphatic unsaturation are more desirable than their unsaturated analogs.

Similarly, the class of halogenated hydrocarbons includes halogenated aliphatic hydrocarbons, halogenated cycloaliphatic hydrocarbons and halogenated aromatic hydrocarbons. In the same way, the halogen atom or atoms present can be one or more of the common halogens, fluorine, bromine, chlorine and iodine although the boiling point limitations restrict some of these subclasses to fluorine-containing compounds. Examples include tetrachloroethylene, butyl iodide, 1,1,2-trichloroethane, methylene bromide, ethylene chlorobromide, fluorotoluene, fluorochlorobenzene and the like.

The class of aliphatic ethers includes dialkyl ethers and unsaturated aliphatic ethers. Examples are diallyl ether, dipropyl ether, methyl amyl ether, ethyl butyl ether and the like.

Of particular interest and advantage in the present process are the saturated aliphatic hydrocarbons. These are not only stable and unreactive compounds, but they also have the property of mutual insolubility with chloroacetyl chloride at moderately low temperatures so that the distilled and condensed azeotrope can be separated by cooling into two liquid phases, thereby greatly facilitating the separation of pure chloroacetyl chloride. A hydrocarbon fraction consisting essentially of heptanes and octanes is a useful and readily available member of this class.

This process can be operated either as a batch process or continuously. In batchwise operation using an aliphatic hydrocarbon such as heptane, for example, the distilled azeotrope separates into two layers upon cooling to −10°C. and the heavy chloroacetyl chloride layer is drawn off for a finishing distillation to remove any remaining heptane. The light heptane layer is returned to the still if more is needed. When all of the chloroacetyl chloride has been separated, the light layer is withdrawn until all heptane is removed from the still pot, leaving dichloroacetyl chloride as the residue.

Continuous operation is preferred for commercial practice. In this type of operation, using the system above, the chloroacetyl chloride-dichloroacetyl chloride mixture plus heptane can be fed into a fractional distillation column at about its midpoint and the chloroacetyl chloride-heptane azeotrope distillate is condensed into a liquid separator where it is chilled to −10°C. or below to form two liquid phases. Most of the heavy layer passes to a finishing column for removal of remaining heptane. Pure chloroacetyl chloride is drawn off from the bottom of the finishing column. Some of the heavy layer in the separator is fed as needed into the top of the main distillation column as reflux. The light (heptane) layer from the separator plus heptane from the finishing column is also fed into the top of the main column while pure dichloroacetyl chloride is drawn off from the bottom of the main column, conditions in this column being maintained such that the heptane inventory remains principally in the upper part. When equilibrium has been established, only small amounts of heptane need be added to the mixed chlorinated acetyl chloride feed from time to time as makeup to replace mechanical losses. The system thus operates with an essentially constant inventory of heptane while the effluent products are substantially pure chloroacetyl chloride and substantially pure dichloroacetyl chloride.

Both the batchwise and continuous modes of operation are similarly operable using octane or a heptane-octane fraction as the hydrocarbon azeotropeforming agent. Cooling the distillate to about −20°C. causes separation into two liquid phases as described above.

Table 1 lists the boiling points and compositions at various absolute pressures for some of the preferred azeotropic systems discussed above. The figures can be used as a guide to operating conditions for either batchwise or continuous operation of the separation process. These data were determined by distilling small samples for analysis from the various mixtures.

TABLE I

| Acid Chloride | Azeotroping Agent | Pressure mm. Hg. | B.p. °C. | Azeotrope Wt. % Chloride |
|---|---|---|---|---|
| Chloroacetyl chloride | n-Heptane | 760 | 90 | 45 |
| " | Toluene | 760 | 105 | 80 |
| " | Toluene | 100 | 51 | 80 |
| Dichloroacetyl chloride | n-Heptane | 760 | 95 | 37 |

Saturated aliphatic hydrocarbons such as heptanes and octanes of suitable boiling points are preferred azeotropic agents because they are immiscible with chloroacetyl chloride at moderately low temperatures and this makes possible an easy separation of azetropic agent from the chloroacetyl chloride in a two-phase distillate. The approximate critical solution temperature of the n-heptane-chloroacetyl chloride system, for example, is about −10° while the n-heptane-dichloroacetyl chloride system is a homogeneous solution below −78° C.

EXAMPLES 1-5

The efficiencies of various azeotroping agents were determined by making up a mixture of 90% by weight chloroacetyl chloride and 10 percent dichloroacetyl chloride and distilling small samples from this mixture with and without azeotropic agent at atmospheric pressure using a 0.5 × 12 inch Vigreux column. Benzene is included as a comparative example of a related but ineffective compound outside the scope of the present invention. The data thereby obtained are listed in Table II.

TABLE II

| Azeotroping Agent | Wt. % Dichloroacetyl Chloride Still Residue | Distillate |
|---|---|---|
| None | 10 | 9 |
| Benzene | 10 | 10 |
| n-Heptane | 10 | 4.1 |
| Toluene | 10 | 5.6 |
| n-Octane | 10 | 4.1 |
| Diallyl Ether | 10 | 2.1 |
| Tetrachloroethylene | 10 | 4.9 |

More complete separation is obtained by use of a more efficient distillation column.

When the procedure of Examples 1-5 is repeated using methylene bromide, methylcyclohexane, 1,1,2-trichloroethane, fluorotoluene or methyl amyl ether as the azeotroping agent, similar results are obtained. Similarly, a paraffinic hydrocarbon fraction consisting essentially of heptanes and octanes also provides efficient separation of chloroacetyl chloride from dichloroacetyl chloride when it is used as the azeotrope-former. Such a fraction, which is really a gasoline, behaves substantially as a single hydrocarbon compound under the conditions of the process and no significant fractionation of the individual hydrocarbon species takes place during the distillation.

I claim:

1. A process for separating chloroacetyl chloride from its mixture with dichloroacetyl chloride which comprises adding to said mixture an azeotrope-forming agent and distilling the azeotrope of chloro-acetyl chloride and said agent from the resulting mixture, wherein said agent has a boiling point at atmospheric pressure of about 90°-130°C. and is a hydrocarbon, a halogenated hydrocarbon or an aliphatic hydrocarbon ether.

2. The process of claim 1 wherein the azeotrope-forming agent is a saturated aliphatic hydrocarbon.

3. The process of claim 2 wherein the hydrocarbon is heptane.

4. A continuous process for separating chloroacetyl chloride from its mixture with dichloroacetyl chloride which comprises continuously introducing said mixture and saturated aliphatic hydrocarbon having a normal boiling point of about 90°-130°C. into a first fractional distillation column, continuously removing therefrom a first distillate fraction and a first residue fraction, cooling said first distillate fraction at least to about −10°C., thereby causing separation into two liquid layers, the cooled first distillate fraction consisting of an upper liquid layer which is essentially the saturated hydrocarbon and a lower liquid layer which is substantially chloroacetyl chloride, said first residue consisting essentially of dichloroacetyl chloride, continuously withdrawing said first residue, continuously returning said upper liquid layer and a minor proportion of said lower liquid layer to the first distillation column, continuously introducing the major proportion of the lower liquid layer into a second fractional distillation column, continuously removing from said second column a second distillate which is essentially saturated hydrocarbonchloroacetyl chloride azeotrope and a second residue which is purified chloroacetyl chloride, and returning said second distillate to said first column.

5. The process of claim 4 wherein the saturated hydrocarbon is heptane.

* * * * *